(12) United States Patent
Allen et al.

(10) Patent No.: US 7,857,179 B1
(45) Date of Patent: Dec. 28, 2010

(54) LATCHING ASSEMBLY FOR A FOLDING EQUIPMENT CARRIER

(75) Inventors: Richard A. Allen, Concord, MA (US); Alexander R. Allen, Vero Beach, FL (US)

(73) Assignee: R. A. Allen Company, Inc., Vero Beach, FL (US)

( * ) Notice: Subject to any disclaimer, the term of this patent is extended or adjusted under 35 U.S.C. 154(b) by 438 days.

(21) Appl. No.: 11/901,570

(22) Filed: Sep. 17, 2007

(51) Int. Cl.
*B60R 9/10* (2006.01)
(52) U.S. Cl. .................. 224/504; 224/924; 224/502; 224/505; 224/329; 224/493
(58) Field of Classification Search ............ 224/497, 224/492, 493, 502, 329, 924, 504, 314, 505–507; 211/105.5
See application file for complete search history.

(56) References Cited

U.S. PATENT DOCUMENTS

| | | | | | |
|---|---|---|---|---|---|
| 4,428,516 | A | * | 1/1984 | Allen | 224/314 |
| 4,518,108 | A | * | 5/1985 | Allen | 224/314 |
| 4,709,840 | A | * | 12/1987 | Allen | 224/314 |
| 5,611,119 | A | * | 3/1997 | Allen | 24/301 |
| 5,645,202 | A | * | 7/1997 | Kaloustian | 224/314 |
| 5,762,163 | A | * | 6/1998 | Kain | 182/161 |
| 5,971,241 | A | * | 10/1999 | Allen et al. | 224/497 |
| 6,026,933 | A | * | 2/2000 | King et al. | 182/165 |
| 6,357,643 | B1 | * | 3/2002 | Janner et al. | 224/310 |
| 7,118,016 | B1 | * | 10/2006 | Kolda | 224/500 |
| 2002/0117524 | A1 | * | 8/2002 | Jeong | 224/314 |
| 2006/0157523 | A1 | * | 7/2006 | Girod et al. | 224/497 |
| 2006/0186161 | A1 | * | 8/2006 | Huang | 224/497 |

* cited by examiner

*Primary Examiner*—Nathan J Newhouse
*Assistant Examiner*—John Cogill
(74) *Attorney, Agent, or Firm*—Herbert L. Bello (57) ABSTRACT

A universal folding carrier for carrying objects on tailgates of pickup trucks and trunk lids of automobiles or the like has a substantially U-shaped frame, a substantially U-shaped carrying member and a substantially U-shaped supporting member. The folding carrier is movable between a folded or storage position and a locked extended or operational position. The carrying arm is pivotally mounted to the frame and the supporting member is pivotally mounted to the frame. A latching assembly includes a pair of first brackets. The first brackets are mounted on opposite sides of the frame. A pair of second brackets is mounted to opposite sides of the carrying member, each second bracket having a ramp portion and a latch. A latching assembly with first and second latching members is mounted to the first brackets. Each latching member has an engaging pin, the engaging pins extending from opposite ends of the latching members. The first latching member includes a first trigger assembly and the second latching member includes a second trigger assembly, the trigger assemblies being urged apart by a spring. The engaging pins are position for locked engagement with the latches when the folding carrier is in its extended position. The trigger assemblies are spaced apart a distance that permits a user using one hand to move the trigger assemblies towards one another for disengaging the engaging pins from the latches so that the folding carrier can be moved from its locked extended position to its folded position.

19 Claims, 8 Drawing Sheets

LATCHING ASSEMBLY FOR A FOLDING EQUIPMENT CARRIER

BACKGROUND OF THE INVENTION

1. Field of Invention

The present invention relates to carriers that are configured to be attached to motor vehicles for carrying such objects as bicycles, skis, luggage and the like and, more particularly, is directed towards a folding carrier of the foregoing type which can be easily released from a locked extended or operational position to a folded or storage position by a user using one hand.

2. Description of the Prior Art

In recent years, the popularity of bicycle riding for sport, recreation and transportation has increased. Folding bicycle carriers of various configurations have been designed which enable the bicycle owner to transport one or more bicycles from place to place by means of his/her automobile. Prior art folding carriers are moved from a locked extended or operational position to a folded or storage position by manipulating spaced apart locking devices. Either the locking devices of prior art folding carriers are unlocked separately or the operator uses two hands to unlock the locking devices. Prior art folding bicycle carriers are shown in U.S. Pat. Nos. 3,927,811; 4,518,108; 4,709,840; 4,830,250; 5,056,699; 5,826,767; 6,286,738 and 6,345,748. A need has arisen for a folding carrier of the foregoing type which can be easily released by a user using one hand from a locked extended or operational position to a folded or storage position.

SUMMARY OF THE INVENTION

It is an object of the present invention to provide a folding carrier of the type that can be easily released from a locked extended or locked operational position to a folded or storage position by a user using one hand. The folding carrier embodying the present invention includes a substantially U-shaped main frame to which a carrying member and a supporting member are pivotally mounted for movement between a collapsed position and an extended position. The carrying member is a substantially U-shaped member having a pair of rearwardly extending carrying arms and the supporting member is a substantially U-shaped member having a forward foot bar and a pair of forwardly extending legs. One of a pair of first brackets is mounted to one side of the main frame and the other of the first brackets is mounted to an opposite side of the main frame. One of a pair of second brackets is mounted to one of the carrying arms and the other of the second brackets is mounted to the other carrying arm. Each second bracket has a ramp portion and a latch. A latching assembly is connected between the first brackets. The latching assembly included a pair of spring loaded engaging pins. One engaging pin is configured to be moved into lockingly engagement with the latches in one of the second brackets and the other engaging pin is configured to be moved into lockingly engagement with the latch in the other second bracket. As the carrier is moved from its storage position to its locked operational position, the engaging pins slide along the ramp potions of the second brackets, the engaging pins moving towards the latches. The folding carrier is locked in its operation position when the engaging pins are received in locked engagement with the latches in the second brackets. A trigger is operatively connected to each of the engaging pins for disengaging the engaging pins from their locked engagement with the latches. The triggers are spaced apart a distance that permits a user to move the triggers towards one another using one hand, the engaging pins disengaging from locked engagement with the latches when the triggers are move towards one another.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
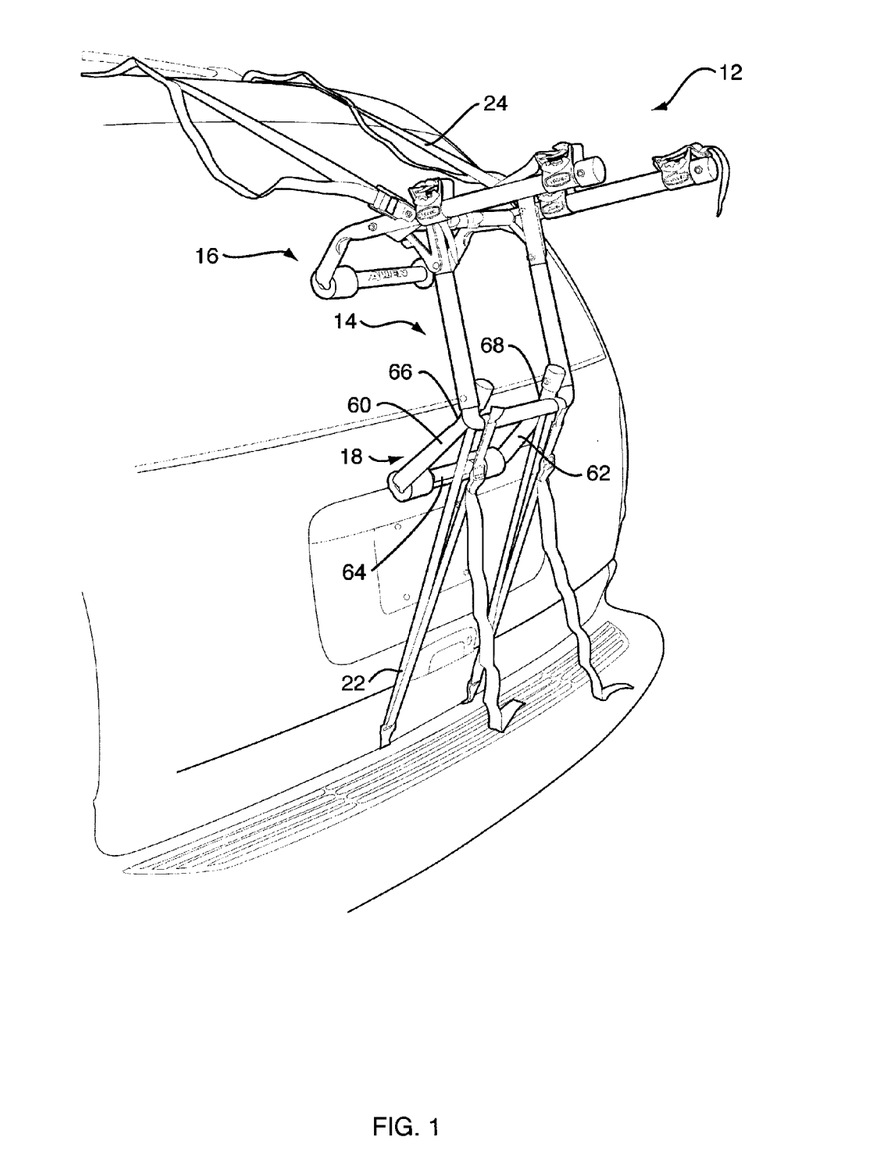
FIG. 1 is a perspective view of a folding carrier made in accordance with the invention, the carrier being mounted on an automobile.

Referring now to the drawings, particularly FIG. 1, there is shown a folding carrier 12 embodying the present invention mounted on an automobile. As hereinafter described, folding carrier 12 is movable between a flat collapsed or folded position shown in FIG. 2A and a locked extended or operational position shown in FIG. 2C.

Folding carrier 12 includes a main frame 14, a carrying member 16 and a supporting member 18. A latching assembly 20 is provided for releasably locking folding carrier 12 in its operational position with carrying member 16 being substantially perpendicular with respect to main frame 14. Attaching hardware such as a rear straps 22 and front straps 24 secure carrier 12 to the automobile. Rear straps 22 are placed over main frame 14 and front straps 24 are attached to opposite sides of carrying member 16.

In the illustrated embodiment, main frame 14 is a substantially U-shaped member, for example a hollow metal pipe, and includes a first side leg 26, a cross member 28 and a second side leg 30. Protective covers 32 are provided on main frame 14. As hereinafter described, carrying member 16 is pivotally mounted to an upper portion of side legs 26 and 30. Supporting member 18 is pivotally mounted to a lower end of side legs 26 and 30 by means of pins or fasteners 36, for example screws with lock nuts. Carrying member 16 is mounted on the outside of side legs 26, 30 and constrained for limited rotational movement relative to frame 14. Supporting member 18 is mounted on the inside of side legs 26, 30 and constrained for limited rotational movement relative to frame 14.

Carrying member 16 is a substantially U-shaped member, for example a hollow metal pipe, and includes a pair of carrying arms 40, 42 and a front foot bar 44 which is bent downwardly to form a clamping member. The ends of arms 40 and 42 are provided with end caps 50. A suitable protective covering 52, such as a plastic tubing or the like, may cover all of or a portion of carrying arms 40, 42. In the illustrated embodiment, tie down members 53, for examples, tie down members of the type shown in U.S. Pat. No. 5,598,960, incorporated herein by reference, are mounted on carrying arms 40 and 42. Shock absorbing feet 54, for example resilient feet such as molded rubber members, are mounted on front bar 44.

Supporting member 18 is a substantially U-shaped member, for example a hollow metal pipe, and includes a pair of outwardly bent legs 60, 62 and a base member 64. The corners of base member 64 and legs 60, 62 are bent greater than ninety degrees to permit the end portions 66 and 68 to rest against legs 26 and 30 when supporting member 18 is in its collapsed or storage position. The corners of base member 64 and legs 60, 62 are bent in the manner described so as to form a rear foot bar which is sufficiently long to prevent it from passing between legs 60,62 when supporting member 18 is in its collapsed or storage position. That is, the length of the rear foot bar 64 is greater than the length of cross member 28. As previously indicated, supporting member 18 is mounted on the inside of side legs 26, 30. Accordingly, supporting member 18 is constrained for limited rotational movement relative to frame 14. That is, as supporting member 18 is rotated to its extended position, legs 60 and 62 press against cross member 28 and prevent further rotational movement of the supporting member. A pair of shock absorbing feet 70, for example resilient feet such as molded rubber members, are mounted on rear foot bar 64.

As previously indicated, latching assembly 20 is provided for releasably locking folding carrier 12 in its locked extended or operational position. The details of latching assembly 20 are best shown in FIGS. 2A, 3A, 3B, 4A and 4B. Latching assembly 20 includes a pair of spring loaded latching members 72,74 and a pair of first brackets 78, 80. Latching members 72 and 74 are mounted within a hollow support member 76 and constrained for slidable movement therein. One end of support member 76 is secured to first bracket 78 and the other end of support member 76 is secured to first bracket 80. In the illustrated embodiment, by way of example, opposite ends of support member 76 are welded to first brackets 78 and 80. First bracket 80 is secured to side leg 30 of frame 14 by means of a bolt and lock nut assembly 82 and a bolt and lock nut assembly 84. Bolt and lock nut assembly 82 clamp first bracket 80 to side leg 30. Bolt and lock nut assembly 84 clamp first bracket 80 to side leg 30 and pivotally mount carrying arm 40 to side leg 30. Although not clearly shown, first bracket 78 is secured to side leg 26 and carrying arm 42 is pivotally mounted to side leg 26 in a manner that is similar to the securing of first bracket 80 to side leg 30 and the pivotal mounting of carrying arm 40 to side leg 30. In the illustrated embodiment, first bracket 78 is identical to first bracket 80, each first bracket being composed of metal.

A pair of second brackets 86,88 are provided for engaging latching assembly 20 and locking folding carrier 12 in its extended or operational position. Second bracket 86 is mounted to carrying member 40 by means of bolt and lock nut assembly 84 and a bolt and nut assembly 90. Although not clearly shown, second bracket 88 is secured to carrying member 42 in a similar manner by which second bracket 86 is secured to carrying member 40. Second bracket 86 is provided with a latch 92, for example a hole formed in second bracket 86, and second bracket 88 is formed with a latch 94, for example a hole formed in second bracket 88. In the illustrated embodiment, second bracket 86 is identical to second bracket 88, each second bracket being composed of metal.

Figure 3A:
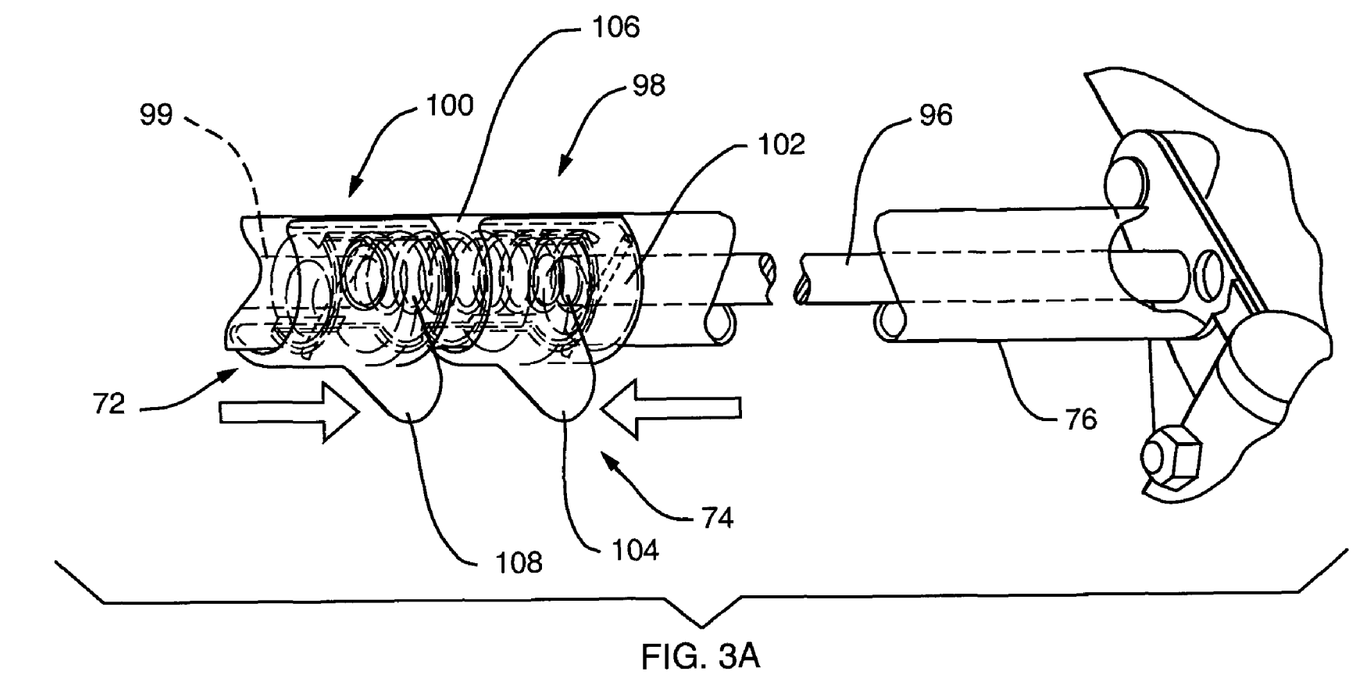
FIG. 3A is a perspective view showing one side of a latching member prior to the folding carrier being locked in its operational position.
Figure 3B:
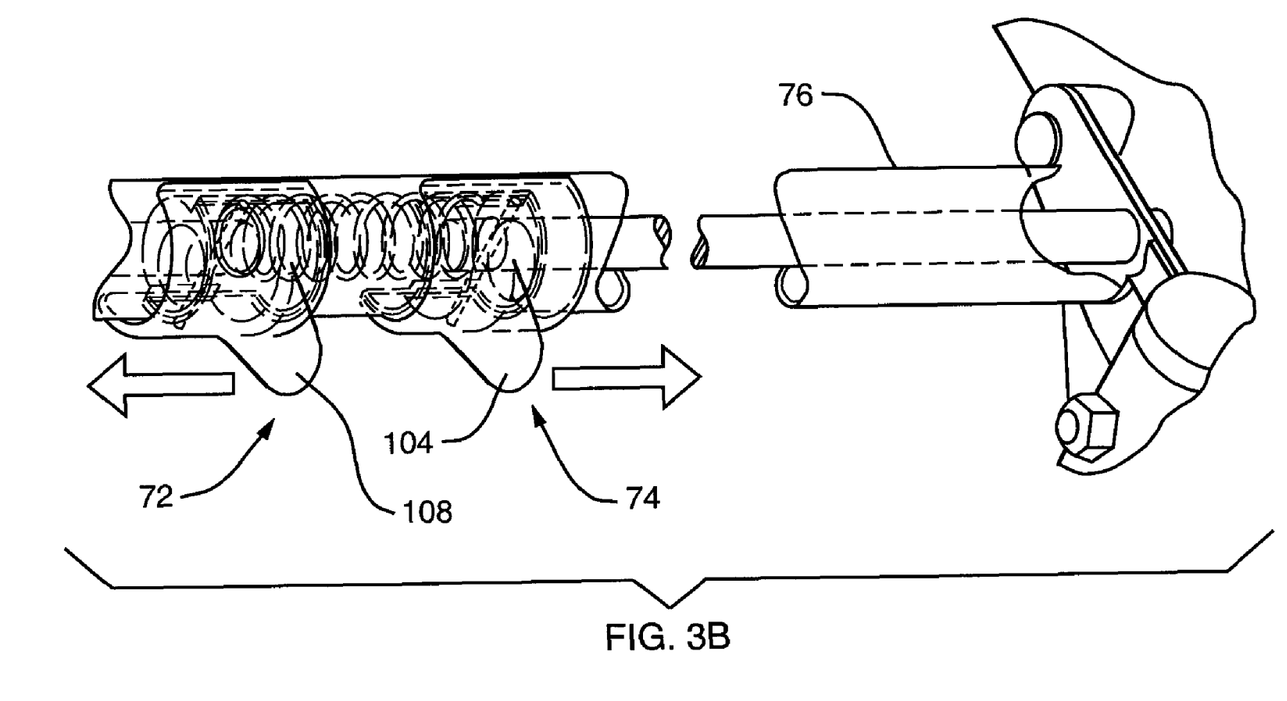
FIG. 3B is a perspective view showing one side of a latching member after the folding carrier is locked in its operational position.

Referring now to FIGS. 3A and 3B, it will be seen that latching member 72 is an elongated member 96, for example a rod or engaging pin, that is seated in a trigger 98 and latching member 74 is an elongated member 99, for example a rod or engaging pin, that is seated in a trigger 100. As hereinafter described, triggers 98 and 100 define an actuator 101 for moving engaging pins 96 and 99 out of engagement with brackets 86 and 88, respectively, so that carrying member 16 can be moved from its locked position to its folded position. In an alternative embodiment, actuator 101 is a movable knob or lever that is operatively connected to latching members 72 and 74 for moving engaging pins 96 and 99 out of engagement with brackets 86 and 88, respectively.

Trigger 98 includes a body 102 and an upright purchase 104, body 102 is constrained for slidable movement relative to support member 76. Engaging pin 96 is fixed to body 102 so that the engaging pin 96 moves with movement of trigger 98. Trigger 100 includes a body 106 and an upright purchase 108, body 106 being constrained for slidable movement relative to support member 76. Engaging pin 99 is fixed to body 106 and moves with movement of trigger 100. Although not clearly shown, it is to be understood that openings are provided in first brackets 78 and 80 that permit engaging pins 96 and 99 to pass freely through first brackets 78 and 80, and engage second brackets 86 and 88. Triggers 98 and 100 are urged away from one another by a biasing member 110, for example a spring. Purchases 104 and 108 are spaced apart a distance that permits a user to urge the purchases towards one another using one hand. Accordingly, unlike prior art folding carriers, a user can use one hand to disengage engaging pins 96 and 99 and move folding carrier 12 from its locked extended or operational position to its flat or storage position.

Figure 4A:
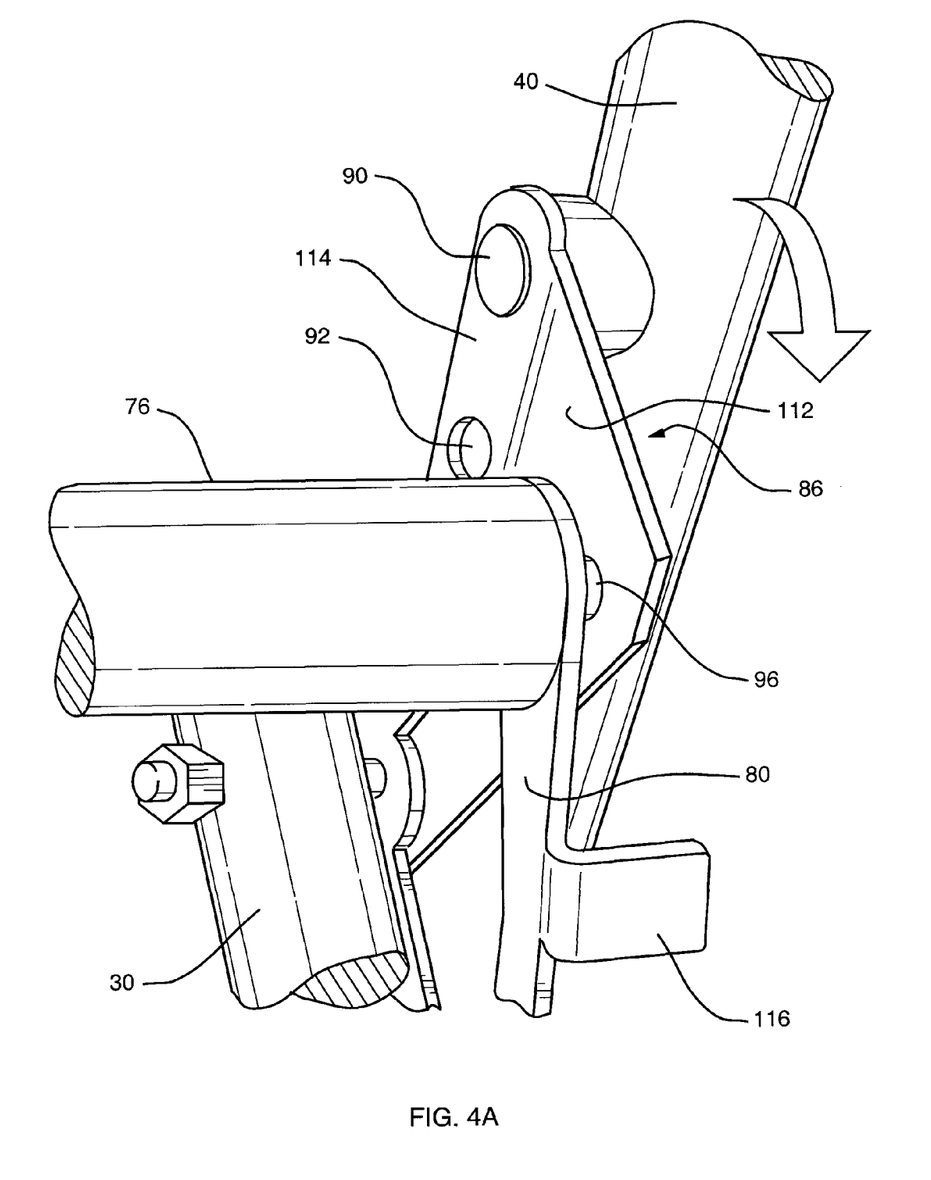
FIG. 4A is an enlarged view showing one side of the latching member prior to the folding carrier being locked in its operational position.
Figure 4B:
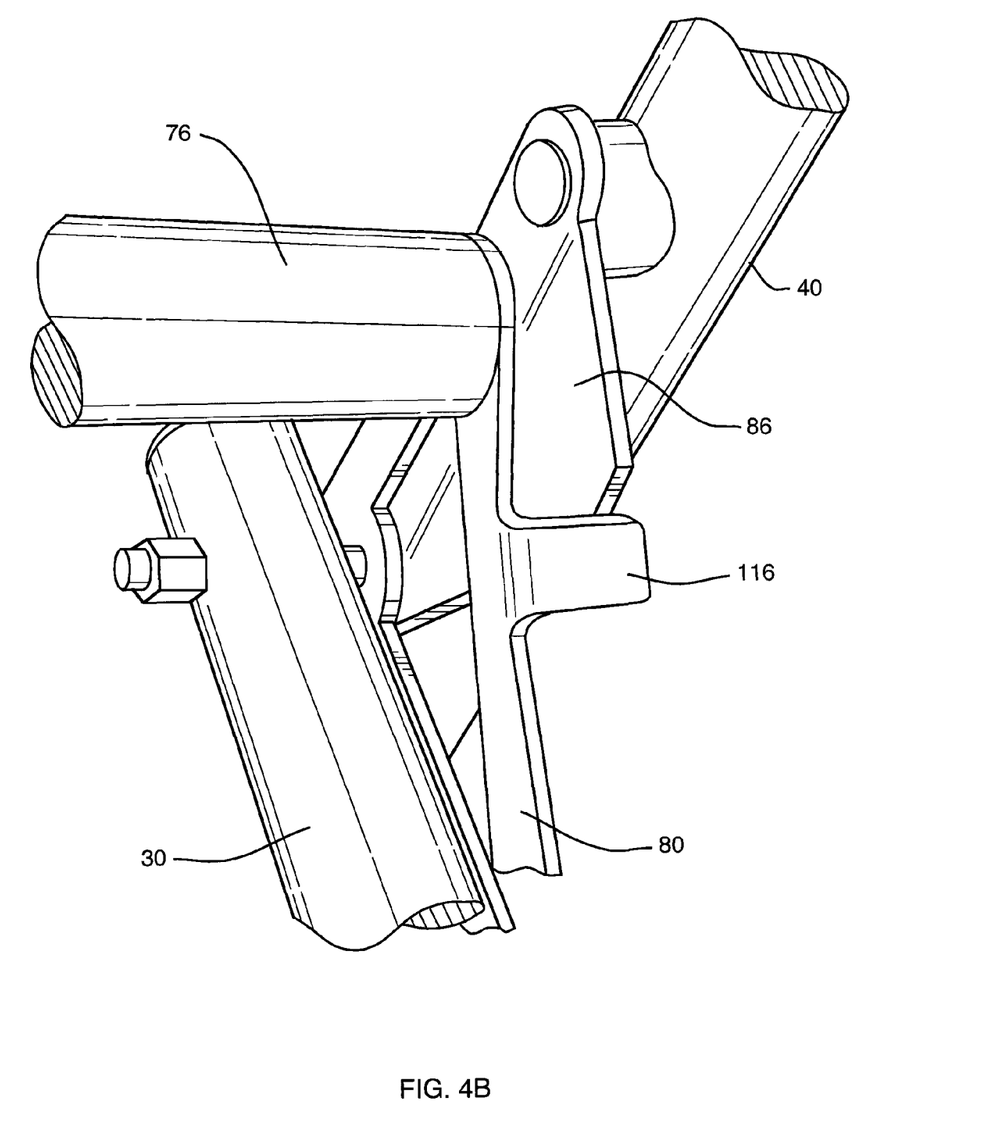
FIG. 4B is a an enlarged view showing one side of the latching member after the folding carrier is locked in its operational position.

As best shown in FIGS. 4A and 4B, second bracket 86 is bent to form a ramp portion 112 and a flat portion 114, latch 92 being disposed in the flat portion 114. Although not shown, second bracket 88, which is identical to second bracket 86, is formed with a ramp portion and a flat portion, latch 94 being in the flat portion. In FIG. 4A, engaging pin 96 is sliding along ramp portion 112 as folding carrier 12 is being moved from its flat or storage position to its extended or operational position. Spring 110 is compressed as engaging pin 96 slides along ramp portion 112. It is to be understood that engaging pin 99 is simultaneously undergoing the same movement as described for engaging pin 96. As shown in FIG. 4B, engaging pin 96 is received in latch 92 and engaging pin 99 is received in latch 94, whereby folding carrier 12 is locked in its operational position. The sizes of latches 92,94 and engaging pins 96,99 are such that engaging pin 96 is received in locking engagement with latch 92 and engaging pin 99 is received in locking engagement with latch 94. In order to unlock folding carrier 12 from its locked operational position, a user using one hand squeezes triggers 98 and 100 together to disengage engaging pins 96 and 99 from latches 92 and 94, respectively. When engaging pins 96 and 99 are disengaged, folding carrier 12 can be moved to its folded or storage position. A stop 116 on first bracket 80 and a corresponding stop on first bracket 78 (not shown) limits relative rotational movement of carrying member 16 and main frame 14 as folding carrier 12 is moved to its storage position.

Figure 2A:
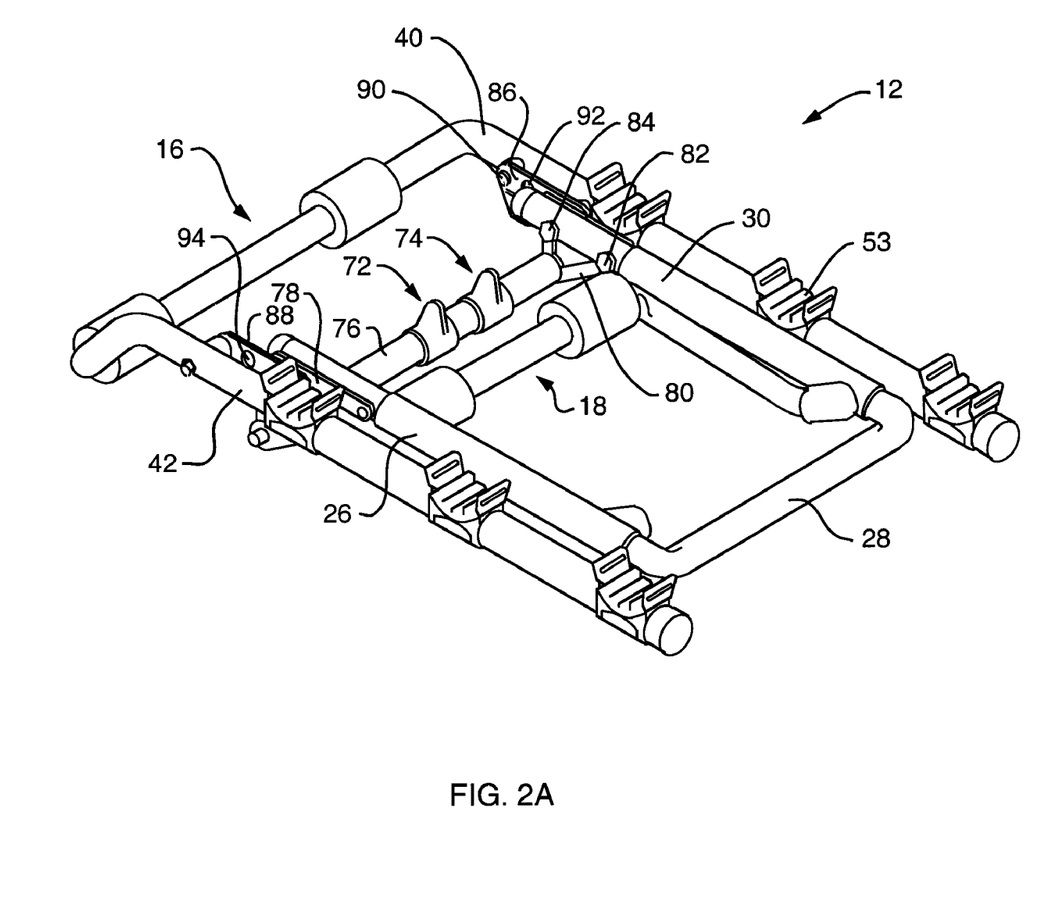
FIG. 2A is a perspective view of the folding carrier of FIG. 1 in its folded position.
Figure 2B:
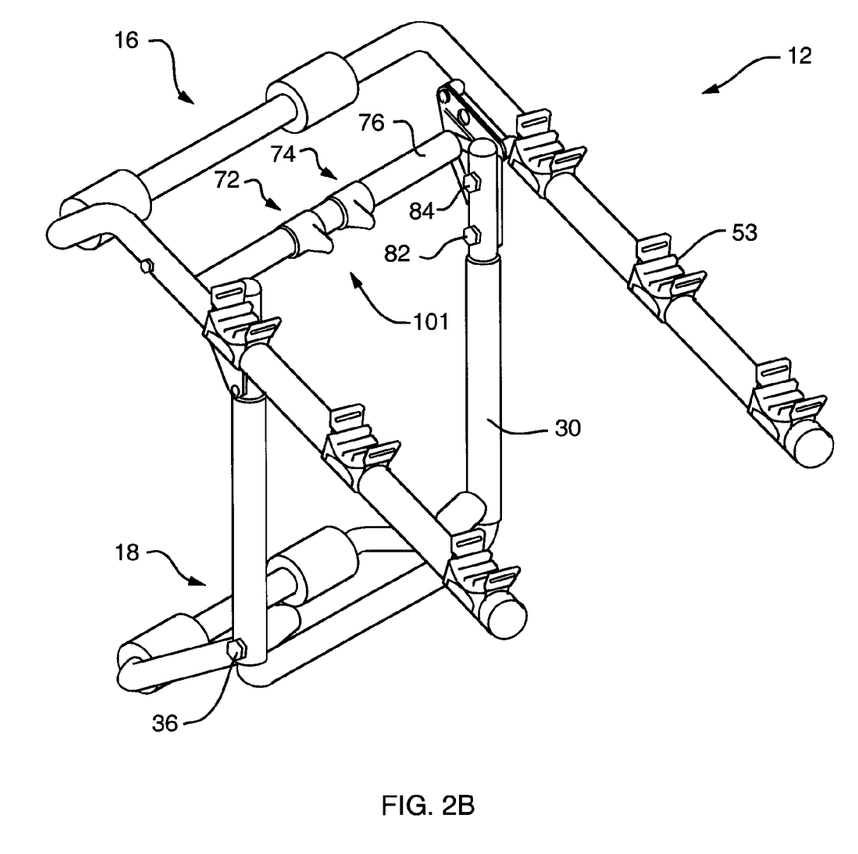
FIG. 2B is a perspective view of the folding carrier of FIG. 1 between its folded and operational positions.
Figure 2C:
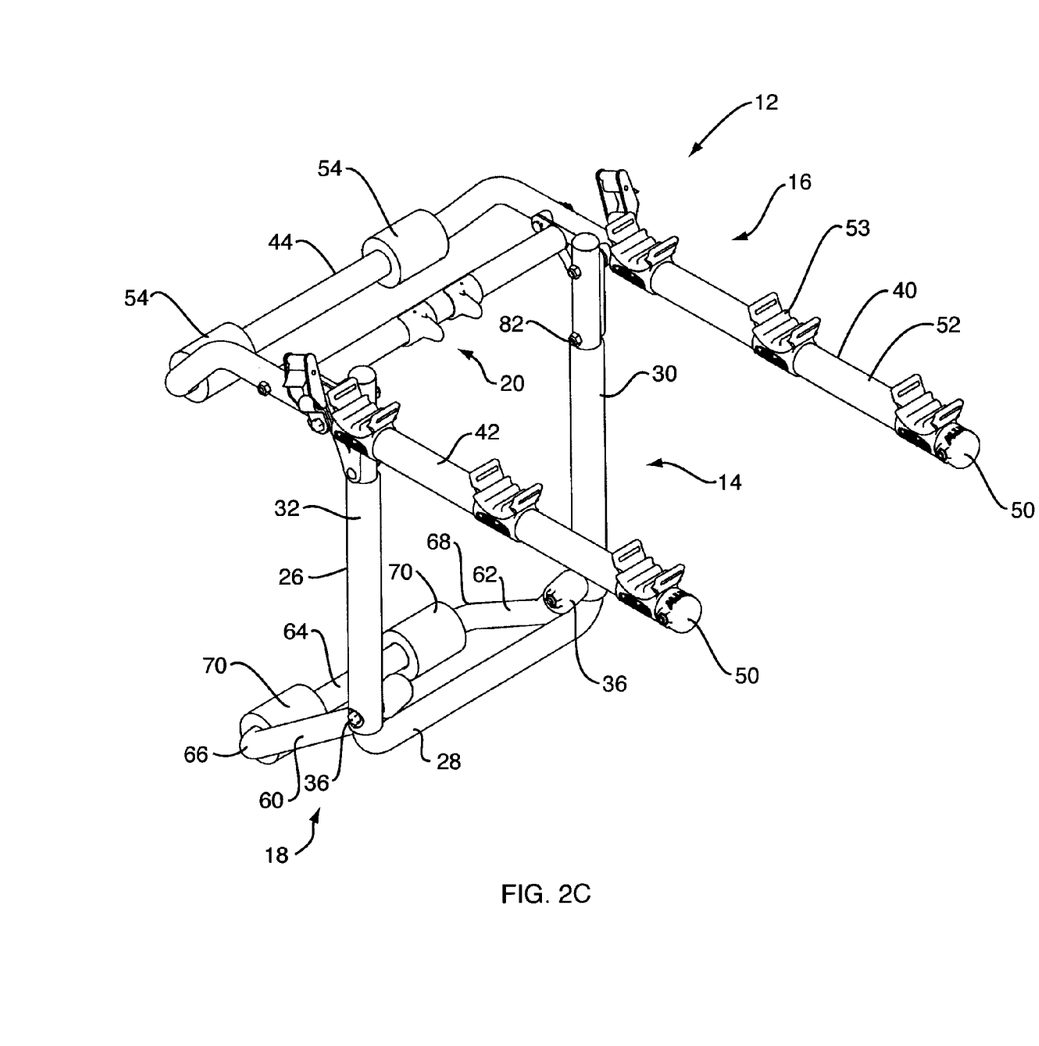
FIG. 2C is a perspective view of the folding carrier of FIG. 1 in its locked operational position.

FIG. 2A shows folding carrier 12 in its flat or storage position. FIG. 2B shows folding carrier 12 in an intermediate position between its storage position and its extended position. In FIG. 2B, engaging pin 96 is sliding along ramp portion 112 of second bracket 86. In FIG. 2C, engaging pin 96 is received in latch 92 and folding carrier 12 is locked in its extending position. As previously indicated, folding carrier 12 is unlocked from its extended position by a user using one hand to squeeze triggers 98 and 100 together for disengaging engaging pins 96 and 99 from latches 92 and 94, respectively.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A folding carrier mountable on a tailgate, trunk lid or the like of a motor vehicle, said carrier configured to carry bicycles and the like, said carrier comprising:
    (a) a substantially U-shaped frame;
    (b) a substantially U-shaped carrying member having a pair of carrying arms and a foot bar pivotally mounted to said frame, one end of each said carrying arm is connected to opposite ends of said foot bar, said carrying member movable between a locked extended position and a collapsed position, said carrying member and said frame being in a substantially side-by-side relationship when said carrying member is in its collapsed position, said carrying member and said frame being substantially perpendicular to one another when said carrying member is in its locked extended position, said foot bar configured to rest on the motor vehicle when said carrying member is in its locked extended position, free ends of said carrying arms extending outwardly and away from the motor vehicle when said carrying member is in its locked extended position and said foot bar is resting on the motor vehicle;
    (c) a substantially U-shaped supporting member having a pair of side legs and a base member, said legs pivotally mounted to said frame, said supporting member constrained for limited rotational movement relative to said frame between an extended position and a collapsed position, said supporting member and said frame substantially in perpendicular relationship to one another when said supporting member is in its extended position, said supporting member and said frame being in a substantially side-by-side relationship when said supporting member is in its collapsed position, said base member configured to rest on the motor vehicle when said supporting member is in its extended position:
    (d) a latching assembly with a pair of first brackets and a pair of movable latching members, an opening formed in each said first bracket, one of said latching members movable in said opening in one of said first brackets and the other of said latching members movable in the other of said openings in the other of said first brackets, one of said first brackets mounted to one side of said frame and the other of said first brackets mounted to an opposite side of said frame, a tubular member extending between and connected to said first brackets, said latching members disposed in said tubular member [between said first brackets], said carrying member pivotally mounted to said first brackets;
    (e) a pair of second brackets, one of said second brackets mounted to one side of said carrying member, the other of said second brackets mounted to an opposite side of said carrying member, each said second bracket having a ramp portion and a latch;
    (f) biasing means engaging said pair of latching members, said biasing means urging said latching members away from one another; and
    (g) a pair of triggers, one of said triggers operatively connected to one of said latching members, the other of said triggers operatively connected to the other of said latching members;
    (h) said latching members engaging and sliding along said ramp portions of said second bracket means as said carrying member is moved from its collapsed position to its extended position, said triggers urged towards one another against said urging of said biasing means as said latching members slide along said ramp portions, said latching members moved into locked engagement with said latches of said second brackets, said carrying member being in its locked extended position when said latching members are in locked engagement with said latches, said triggers are spaced apart a distance that permits a user using one hand to move said triggers towards one another for disengaging said latching members from said latches;
    (i) said triggers moved towards one another for disengaging said latching members from said latches, said triggers moved towards one another by a user using one hand, said carrying member movable from its extended position to its collapsed position when said latching members are disengaged from said latches.

2. The folding carrier as claimed in claim 1 wherein each said trigger includes a body portion having an upright purchase, said body portion of each said trigger constrained for slidable movement relative to said support member, said latching members moving with movement of said triggers, said purchases are spaced apart so that said purchases can be moved towards one another by a user using one hand for disengaging said latching members from said latches.

3. The folding carrier as claimed in claim 1 wherein said latching assembly includes a support member having first and second ends, said first end of said support member connected to one of said first brackets, said second end of said support member connected to the other of said first brackets.

4. The folding carrier as claimed in claim 3 wherein said support member is a hollow support member, said latching members positioned within said hollow support member.

5. The folding carrier as claimed in claim 1 wherein said latching assembly includes a hollow support member having first and second ends, said first end of said support member connected to one of said first brackets, said second end of said support member connected to the other of said first brackets and wherein each said trigger includes a body portion having an upright purchase, said purchases are spaced apart so that said triggers can be moved towards one another by a user using one hand for disengaging said latching members from said latches.

6. The folding carrier as claimed in claim 5 wherein said biasing means is positioned between said bodies of said triggers, said biasing means urging said triggers away from each other.

7. The folding carrier as claimed in claim 6 wherein said biasing means is a spring.

8. A folding carrier mountable on a tailgate, trunk lid or the like of a motor vehicle, said carrier configured to carry bicycles and the like, said carrier comprising:
    (a) a substantially U-shaped frame;
    (b) a substantially U-shaped carrying member having first and second carrying arms and a foot bar, one end of said first carrying arm connected to one end of said foot bar, one end of said second carrying arm connected to an opposite end of said foot bar, said carrying member pivotally mounted to said frame, said carrying member movable between an extended position and a collapsed position, said carrying member and said frame being in a substantially side-by-side relationship when said carrying member is in its collapsed position, said carrying member and said frame being substantially perpendicular to one another when said carrying member is in its extended position, said foot bar configured to rest on the motor vehicle when said carrying member is in its extended position, free ends of said first and second carrying arms extending outwardly and away from the motor vehicle when said carrying member is in its extended position and said foot bar is resting on the motor vehicle;

(c) first and second latching assemblies operatively connected to said frame, said first latching assembly configured to engage and disengage said first carrying arm, said second latching assembly configured to engage and disengage said second carrying arm, said folding carrier locked in its extended position when said first and second latching assemblies are in engagement with said first and second carrying arms, said folding carrier movable from its extended position to its collapsed position when said first and second latching assemblies are disengaged from said first and second carrying arms, said first and second latching assemblies are spaced apart a distance that permits a user using one hand for disengaging said first and second latching assemblies from said first and second carrying arms;

(d) said first latching assembly includes a first bracket and a movable first latching member, and said second latching assembly includes a second bracket and a movable second latching member, said first bracket mounted to one side of said frame and said second bracket mounted to an opposite side of said frame, a tubular member extending between and connected to said first and second brackets, said first and second latching members disposed in said tubular member:

(e) a supporting member pivotally mounted to said frame, said supporting member constrained for limited rotational movement relative to said frame between an extended position and a collapsed position, when said supporting member is in its extended position, a portion of said supporting member presses against said frame and prevents further movement of said supporting member relative to said frame, said supporting member and said frame substantially in perpendicular relationship to one another when said supporting member is in its extended position, said supporting member and said frame being in a substantially side-by-side relationship when said supporting member is in its collapsed position.

9. The folding carrier as claimed in claim 8 wherein said first latching assembly includes a movable first latching member, and said second latching assembly includes a movable second latching member, said first and second latching members constrained for slidable movement relative to said support member, said carrying member pivotally mounted to said first and second brackets.

10. The folding carrier as claimed in claim 9 including a pair of third brackets, one of said third brackets mounted to said first carrying member, the other of said third brackets mounted to said second carrying member, each said third bracket having a ramp portion and a latch, said first latching member configured to lockingly engage one of said latches, said second latching member configured to lockingly engage the other of said latches.

11. The folding carrier as claimed in claim 10 including biasing means disposed between said first and second latching members, said biasing means urging said first and second latching members away from one another.

12. The folding carrier as claimed in claim 11 including a pair of triggers, one of said triggers operatively connected to said first latching member, the other of said triggers operatively connected to said second latching member, each said trigger having a body portion and an upright purchase, said body portions slidably mounted to said support member, said purchases are spaced apart so that said triggers can be urges towards one another by a user using one hand for moving said triggers towards one another and disengaging said first and second latching members from said latches.

13. The folding carrier as claimed in claim 12 wherein said biasing means is positioned between said body portions of said triggers, said biasing means urging said triggers away from one another.

14. The folding carrier as claimed in claim 13 wherein said biasing means is a spring.

15. A folding carrier mountable on a tailgate, trunk lid or the like of a motor vehicle, said carrier configured to carry bicycles and the like, said carrier comprising:

(a) a substantially U-shaped frame;

(b) a substantially U-shaped carrying member having a pair of carrying arms and a foot bar is pivotally mounted to said frame, one end of each said carrying arm is connected to opposite ends of said foot bar, said carrying member movable between an extended position and a collapsed position, said carrying member and said frame being in a substantially side-by-side relationship when said carrying member is in its collapsed position, said carrying member and said frame being substantially perpendicular to one another when said carrying member is in its extended position, said foot bar configured to rest on the motor vehicle when said carrying member is in its extended position, free ends of said first and second carrying arms extending outwardly and away from the motor vehicle when said carrying member is in its extended position and said foot bar is resting on the motor vehicle;

(c) a substantially U-shaped supporting member having a pair of side legs and a base member, said legs pivotally mounted to said frame, said supporting member constrained for limited rotational movement relative to said frame between an extended position and a collapsed position, said supporting member and said frame substantially in perpendicular relationship to one another when said supporting member is in its extended position, said supporting member and said frame being in a substantially side-by-side relationship when said supporting member is in its collapsed position, said base member configured to rest on the motor vehicle when said supporting member is in its extended position:

(d) a latching assembly with a pair of first brackets and a pair of movable latching members, an opening formed in each said first bracket, one of said latching members movable in said opening in one of said first brackets and the other of said latching members movable in the other of said openings in the other of said first brackets, one of said first brackets mounted to one side of said frame and the other of said first brackets mounted to an opposite side of said frame, said latching members disposed between said first brackets, a tubular member extending between and connected to said first brackets, said latching members disposed in said tubular member, said carrying member pivotally mounted to said first brackets; said carrying member constrained for pivotal movement relative to said first brackets;

(e) a pair of second brackets, one of said second brackets mounted to one side of said carrying member, the other of said second brackets mounted to an opposite side of said carrying member, each said second bracket having a ramp portion and a latch;

(f) biasing means engaging said pair of latching members for urging said latching members away from one another; and (g) a pair of triggers, one of said triggers operatively connected to one of said latching members, the other of said triggers operatively connected to the other of said latching members, said triggers movable relative to one another, said triggers urged away from one another by said biasing means, said triggers being space apart a distance that permits a user using one hand to move said triggers towards one another;

(h) said latching members engaging and sliding along said ramp portions of said second brackets as said carrying member is moved from its collapsed position to its extended position, said latching members received in said latches of said second brackets when said carrying member is in its extended position;

(i) a user using one hand moves said triggers towards one another for disengaging said latching members from said latches, said carrying member movable from its extended position to its collapsed position when said latching members are disengaged from said latches.

16. The folding carrier as claimed in claim 15 wherein each said trigger includes a body portion having an upright purchase, said body portion of each said trigger constrained for slidable movement relative to said support member, said latching members moving with movement of said triggers, said purchases are spaced apart so that said purchases can be urges towards one another by a user using one hand for moving said triggers towards one another and disengaging said latching members from said latches.

17. The folding carrier as claimed in claim 16 including a support member having first and second ends, said first end of said support member connected to one of said first brackets, said second end of said support member connected to the other of said first brackets.

18. The folding carrier as claimed in claim 17 wherein said support member is a hollow support member, a portion of said body portions of said triggers disposed withing said hollow support member, said biasing means disposed within said hollow body in engagement with said body portions within said support member, said purchases accessible outside of said support member to a user for moving said triggers towards one another using one hand.

19. A folding carrier mountable on a tailgate, trunk lid or the like of a motor vehicle, said carrier configured to carry bicycles and the like; said carrier comprising:

(a) a substantially u-shaped frame;

(b) a substantially u-shaped carrying member having first and second carrying arms and a foot bar, one end of said first carrying arm connected to one end of said foot bar, one end of said second carrying arm connected to an opposite end of said foot bar, said carrying member pivotally mounted to said frame, said carrying member movable between an extended position and a collapsed position, said carrying member and said frame being in a substantially side-by-side relationship when said carrying member is in its collapsed position, said carrying member and said frame being substantially perpendicular to one another when said carrying member is in its extended position, said foot bar configured to rest on the motor vehicle when said carrying member is in its extended position, free ends of said first and second carrying arms extending outwardly and away from the motor vehicle when said carrying member is in its extended position and said foot bar is resting on the motor vehicle;

(c) a supporting member pivotally mounted to said frame, said supporting member constrained for limited rotational movement relative to said frame between an extended position and a collapsed position, said supporting member and said frame substantially in perpendicular relationship to one another when said supporting member is in its extended position, said supporting member and said frame being in a substantially side-by-side relationship when said supporting member is in its collapsed position;

(d) first and second latching assemblies operatively connected to said frame, said first latching assembly configured to engage and disengage said first carrying arm, said second latching assembly configured to engage and disengage said second carrying arm, said carrying member locked in its extended position when said first and second latching assemblies are in engagement with said first and second carrying arms, said carrying member movable from its extended position to its collapsed position when said first and second latching assemblies are disengaged from said first and second carrying arms;

(e) said first latching assembly includes a first bracket and said second latching assembly includes a second bracket, said first bracket mounted to one side of said frame and said second bracket mounted to an opposite side of said frame, a tubular member extending between and connected to said first and second brackets, said first and second latching members disposed in said tubular member;

(f) actuator means operatively connected to said first and second latching assemblies for moving said first and second latching assemblies out of engagement with said first and second carrying arms, said actuator means operated by one hand of an operator who is disengaging said first and second latching assemblies from said first and second carrying arms for moving said carrying member from its extended position to its collapsed position.

* * * * *